United States Patent
Zoni et al.

(10) Patent No.: US 10,106,281 B2
(45) Date of Patent: Oct. 23, 2018

(54) RECEPTACLE CONVEYING AND COOLING APPARATUS, A METHOD OF OPERATING SUCH A RECEPTACLE CONVEYING AND COOLING APPARATUS AND A RECEPTACLE TREATMENT MACHINE HAVING SUCH A RECEPTACLE CONVEYING AND COOLING APPARATUS

(71) Applicant: Sidel Participations, Octeville-sur-Mer (FR)

(72) Inventors: Roberto Zoni, Parma (IT); Tommaso Tegoni, Parma (IT)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 15/865,490

(22) Filed: Jan. 9, 2018

(65) Prior Publication Data
US 2018/0194499 A1    Jul. 12, 2018

(30) Foreign Application Priority Data

Jan. 12, 2017    (EP) .................... 17305039

(51) Int. Cl.
*B65G 47/84*    (2006.01)
*B65B 43/50*    (2006.01)
(Continued)

(52) U.S. Cl.
CPC .......... *B65B 43/50* (2013.01); *B29C 49/6427* (2013.01); *B29C 49/786* (2013.01); *B65G 29/00* (2013.01); *B65G 47/84* (2013.01)

(58) Field of Classification Search
CPC ...... B65G 29/00; B65G 47/84; B65G 47/846; B29C 49/42; B29C 49/64; B08B 9/34
(Continued)

(56) References Cited

U.S. PATENT DOCUMENTS 4,091,059 A * 5/1978 Ryder .................... B29C 49/66
264/28
7,572,123 B2 * 8/2009 Barker .................. B29B 13/025
198/377.07
(Continued)

FOREIGN PATENT DOCUMENTS

EP    2307184 A2    4/2011
FR    2871093 A1    12/2005
(Continued)

OTHER PUBLICATIONS

Extended Search Report from corresponding EP Application No. 17305039.4 dated Jun. 27, 2017 (4 pages).

*Primary Examiner* — James R Bidwell
(74) *Attorney, Agent, or Firm* — Finnegan, Henderson, Farabow, Garrett & Dunner, LLP

(57) ABSTRACT

There is described a conveying and cooling apparatus (6, 6') for conveying and cooling receptacles (2) comprising a conveying device (25) for advancing receptacles (2) along a conveying path (P1), a cooling device (28, 28') for cooling the receptacles (2). The cooling device (28, 28') comprises a supply unit adapted to supply a cooling medium, a plurality of advancing injection nozzles (45) adapted to be in fluid connection with the supply unit and for directing a cooling medium onto the receptacles (2) and a plurality of valve members (46), each one associated to one respective injection nozzle (45) and adapted to selectively open or close the fluid connection between the respective injection nozzle (45) and the supply unit (40, 81).

20 Claims, 5 Drawing Sheets

(51) Int. Cl.
 *B65G 29/00* (2006.01)
 *B29C 49/64* (2006.01)
 *B29C 49/78* (2006.01)

(58) Field of Classification Search
 USPC ............ 198/469.1, 478.1, 952; 264/237, 348
 See application file for complete search history.

(56) References Cited

U.S. PATENT DOCUMENTS

| | | |
|---|---|---|
| 8,574,477 B2 | 11/2013 | Derrien et al. |
| 2002/0076462 A1* | 6/2002 | Boyd ..................... B29C 49/46 |
| | | 425/143 |
| 2010/0018838 A1* | 1/2010 | Kelley .................. B65G 33/06 |
| | | 198/471.1 |
| 2011/0272861 A1* | 11/2011 | Humele .................... A61L 2/12 |
| | | 264/457 |
| 2012/0260955 A1* | 10/2012 | Winzinger .......... B29C 49/4205 |
| | | 134/43 |
| 2015/0225098 A1 | 8/2015 | Söllner et al. |

FOREIGN PATENT DOCUMENTS

| WO | WO 2010/003973 A2 | 1/2010 |
|---|---|---|
| WO | WO 2011/145913 A1 | 11/2011 |

\* cited by examiner

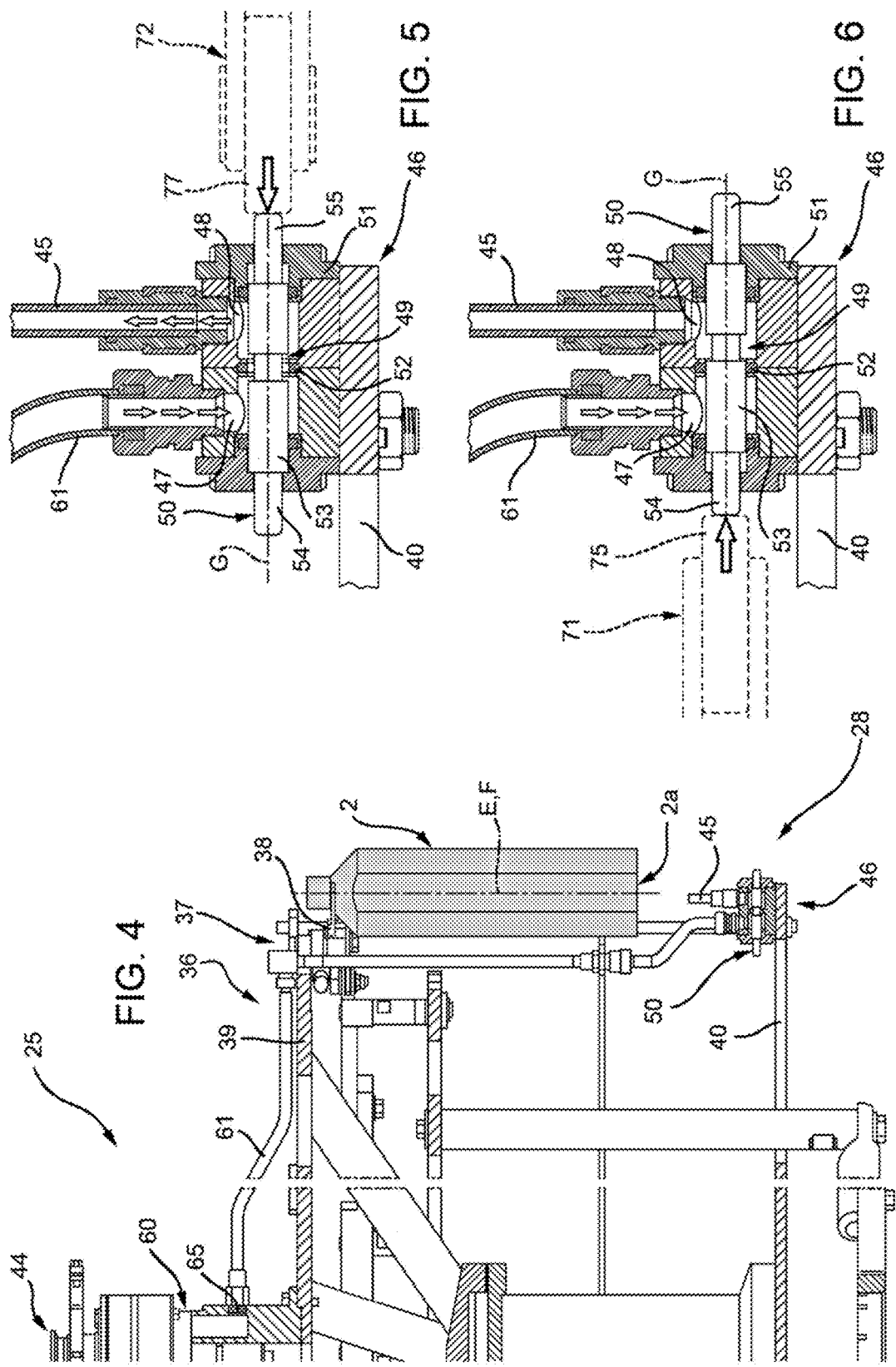

RECEPTACLE CONVEYING AND COOLING APPARATUS, A METHOD OF OPERATING SUCH A RECEPTACLE CONVEYING AND COOLING APPARATUS AND A RECEPTACLE TREATMENT MACHINE HAVING SUCH A RECEPTACLE CONVEYING AND COOLING APPARATUS

CROSS-REFERENCE TO RELATED PATENT APPLICATIONS

This application claims the benefit of European Application No. 17305039.4, filed Jan. 12, 2017. The entire contents of the above-referenced application is expressly incorporated herein by reference.

TECHNICAL FIELD

The present invention relates to a receptacle conveying and cooling apparatus for conveying and cooling receptacles. In particular, the present invention relates to a receptacle conveying and cooling apparatus for cooling the bottom portions of receptacles during the advancement of the receptacles. Even more particular, the present invention relates to a receptacle conveying and cooling apparatus for cooling the bottom portions of receptacles, which are or which are to be filled with a pourable product.

The present invention also relates to a method of operating such a conveying and cooling apparatus according to the present invention.

The present invention also relates to a receptacle treatment machine having at least one conveying and cooling apparatus according to the present invention.

BACKGROUND ART

It is known to fill pourable products such as carbonated liquids (e.g. sparkling water, soft drinks and beer), non-carbonated liquids (e.g. still water, juices, teas, sport drinks, liquid cleaners, wine, etc.), emulsions, suspensions, high viscosity liquids and beverages containing pulps into receptacles such as bottles, containers or the like.

Well-known receptacles are bottles made from thermoplastic polymers such as polyethylene terephthalate (PET), which in the recent years, have become more and more popular.

However, these bottles formed from thermoplastic polymers are known to be critical with respect to their sensitivity to increased temperatures. This is e.g. the case during the so called hot filling of pourable products during which a hot pourable product is filled into the bottles allowing to sterilize the inner walls of the bottle. Additionally, the walls of the bottles are heated and caution has to be taken during the filling step itself and during the further processing of the bottles in order to avoid a possible damaging of the hot bottles and a loss of the pourable product.

Furthermore, in a typical treatment machine these bottles are obtained during a molding process in a molding apparatus of the treatment machine from which the bottles exit at increased temperatures, which makes it necessary for the bottles cooling down prior to being filled or further treated in any other manner.

It is furthermore known that these treatment machines comprise a conveying and cooling apparatus, which advances the bottles exiting from the molding apparatus along an extended conveying path, possibly passing a cooling chamber during which the bottles can cool down. In particular, the cooling time needs to be set such that the bottom portion of the bottles, which is known to contain more material than the sidewalls and accordingly require a longer time to cool down with respect to the sidewalls (lateral surfaces), reaches the temperatures, which allow for performing the next treatment processes.

In the recent years, compact treatment machines have become popular. These compact treatment machines (which are typically of the rotary type) comprise a plurality of treatment apparatuses, which are arranged in a blocked configuration (i.e. the varying treatment apparatuses work at the same operating speeds). In particular, for these compact treatment apparatuses, the presence of a conveying and cooling apparatus having an extended conveying path is disadvantageous as compromising the overall compactness.

A receptacle treatment machine for producing and filling bottles is disclosed in FR-A-2871093. The treatment machine disclosed comprises a blow molding apparatus at which bottles are obtained during a blow molding step from preforms, a filling apparatus for filling the bottles and a conveying and cooling apparatus for advancing the bottles from the blow molding apparatus to the filling apparatus and for cooling the bottles during their advancement.

In more detail, the conveying and cooling apparatus comprises a linear conveying device disposed between the blow molding apparatus and the filling apparatus and a cooling device arranged at the interface between the blow molding apparatus and the conveying device being adapted to direct a cooling medium (air/water mixture) onto the outer surface, in particular onto the outer bottom portion of the receptacles.

In further detail, the cooling device comprises an injection nozzle being fixed in space. In an alternative embodiment briefly mentioned in FR-A-2871093, the injection nozzle is moveable for following at least partially the advancement of the bottles.

A drawback of the conveying and cooling apparatus disclosed in FR-A-2871093 can be seen in the fact that during the injection of the cooling medium also the sidewalls (lateral surfaces) of the bottles become wetted which can turn out to be critical during a successive labeling of the bottles. This problem is further increased if there are gaps within the succession of bottles transferred by the conveying device from the blow molding apparatus to the filling apparatus.

Another treatment machine having an improved conveying and cooling apparatus is disclosed in EP-A-2307184.

In more detail, the treatment machine comprises a blow molding apparatus, which receives preforms and which produces bottles from the preforms during a blow molding step. A succession of hot bottles is obtained, which is delivered to the conveying and cooling device.

In one embodiment disclosed in EP-A-2307184, the conveying and cooling apparatus comprises a conveying carousel being rotatable around a central rotation axis and having a plurality of gripping elements for gripping the bottles during advancement of the bottles due to the rotation of the conveying carousel.

The conveying and cooling apparatus furthermore comprises a cooling device, which is configured to direct a cooling medium (air, water or air/water mixture) in particular on the bottom portions of the bottles.

The cooling device comprises a plurality of injection nozzles, which advance synchronically with the rotation of the conveying carousel so that the injection nozzles always remain arranged directly below the bottles; the cooling medium is directed to the bottom portions of the bottles.

More specifically, the cooling device comprises a fixed annular tank fluidically connected to a supply unit for the supply of cooling medium to the annular tank and an annular cover carrying the injection nozzles rotating, synchronically with the conveying carousel, over the fixed annular channel.

A drawback of the conveying and cooling apparatus disclosed in EP-A-2307184 is that the cooling device is configured so that the cooling medium exits from the injection nozzles in an equal manner also in case one or more bottles lack in the succession of bottles so that not all grippers retain a bottle. This leads to spoilage of the cooling medium and an uncontrolled distribution of the cooling medium onto the bottles currently advanced within the conveying and cooling apparatus. This leads to the presence of water on the sidewalls of the bottles in the case the cooling medium is water or an air/water mixture.

DISCLOSURE OF INVENTION

It is therefore an object of the present invention to provide a receptacle conveying and cooling apparatus to overcome, in a straightforward and low-cost manner, at least one of the aforementioned drawbacks.

According to the present invention, there is provided a conveying and cooling apparatus as claimed in claim 1.

According to the present invention, there is also provided a receptacle treatment machine as claimed in claim 11.

According to the present invention, there is furthermore provided a method for operating such a conveying and cooling apparatus as claimed in claim 12.

BRIEF DESCRIPTION OF THE DRAWINGS

Two non-limiting embodiments of the present invention will be described by way of example with reference to the accompanying drawings, in which:

FIG. 4 shows a partially sectioned view along plane IV-IV of FIG. 3, with parts removed for clarity;

FIG. 5 shows a further detail of the conveying and cooling apparatus in a first configuration, with parts removed for clarity;

FIG. 6 shows the further detail of FIG. 5 in a second configuration, with parts removed for clarity.

BEST MODES FOR CARRYING OUT THE INVENTION

Figure 1:
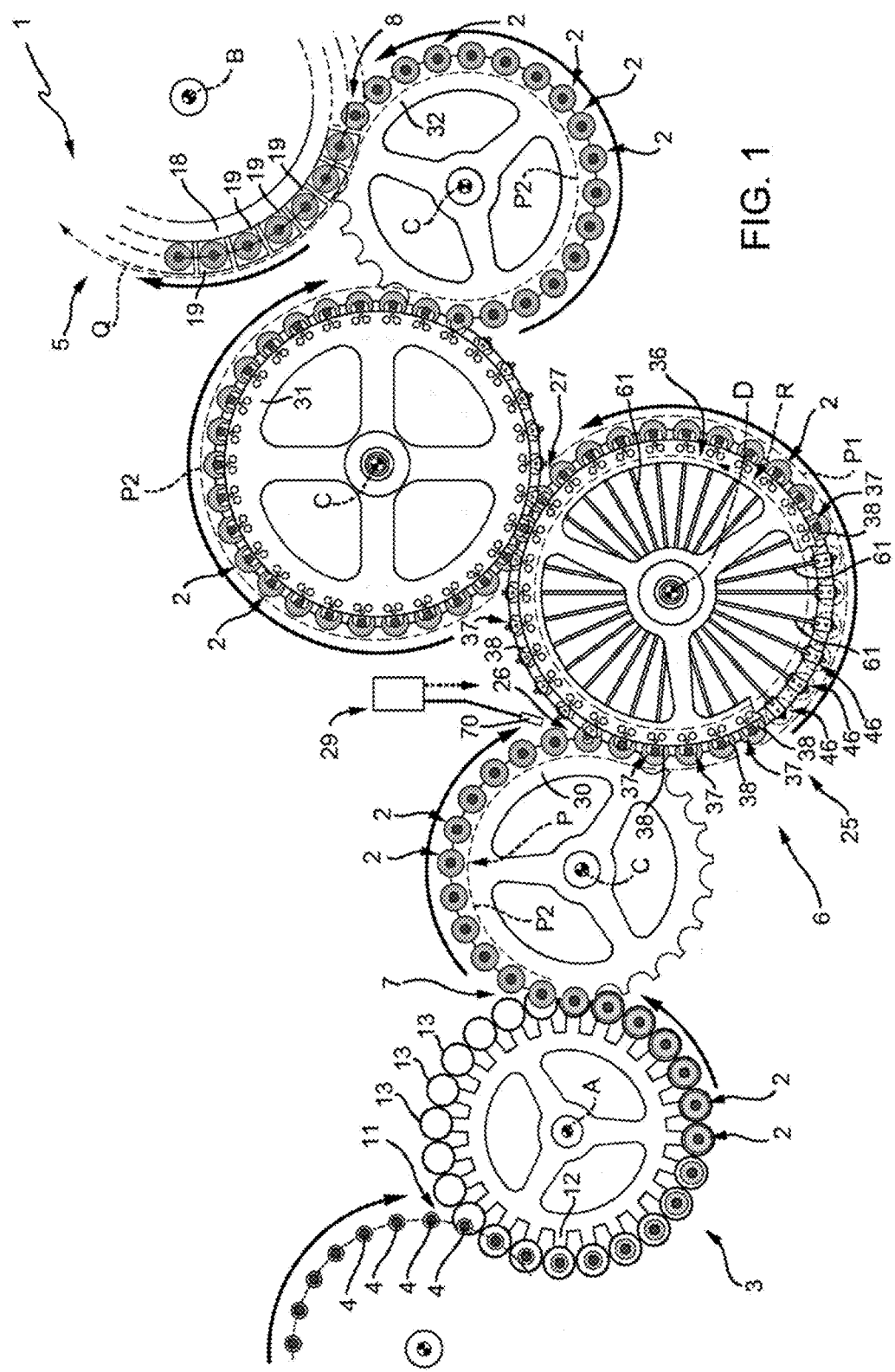
FIG. 1 shows a schematic sketch of a treatment machine having a conveying and cooling apparatus according to the present invention, with parts removed for clarity.

Number 1 in FIG. 1 indicates as a whole a receptacle treatment machine for treating receptacles, such as bottles 2, containers or the like. The following description will refer without any limitative scope to bottles 2 made from a thermoplastic polymer such as polyethylene terephthalate.

Each bottle 2 comprises a bottom portion 2a, in particular a bottom wall, sidewalls 2b, in particular defining lateral surfaces and a neck portion 2c adapted to delimit a pouring/inlet opening opposing bottom portion 2a. The respective bottom portion 2a, sidewalls 2b and neck portion 2c delimit a hollow main body of each bottle 2 for receiving the pourable product.

Machine 1 comprises a plurality of treatment apparatuses, in the specific example shown in FIG. 1 two treatment apparatuses, even more specifically a blow molding apparatus 3 adapted to form bottles 2 from preforms 4 fed to the blow molding apparatus 3; and a filling and labeling apparatus 5 adapted to fill bottles 2 with a pourable product and to apply label sheets onto bottles 2.

Machine 1 further comprises a conveying and cooling apparatus 6 interposed between two respective treatment apparatuses, in the example shown in FIG. 1 between apparatus 3 and apparatus 5 for conveying bottles 2 along a conveying path P from a pick-up station 7 to a delivery station 8. More specifically, apparatus 6 is configured to receive bottles 2 at station 7 from apparatus 3 and to deliver bottles 2 at station 8 to apparatus 5. Apparatus 6 is further adapted to cool bottles 2 during advancement along at least a portion of path P.

In more detail, blow molding apparatus 3 is adapted to receive preforms 4 at a pick-up station 11, to advance the preforms 4 from station 11 towards station 7 and to transform preforms 4 into bottles 2, in particular by means of a blow molding process (known as such an not further explained).

More specifically, apparatus 3 comprises:
a respective carousel 12 rotatable around a central axis A, in particular having a vertical orientation, in particular for advancing preforms 4 from station 11 towards station 7 and to advance bottles 2 after their formation to station 7; and
a plurality of molding units 13 peripherally arranged on carousel 12, in particular arranged equally spaced angularly around axis A and each one being adapted to receive one respective preform 4 at station 11 and having an inner shape configured to define the shape of the respective bottle 2 obtained during the molding step.

In other words, apparatus 3 is configured to receive preforms 4 and to transform preforms 4 into bottles 2 during rotation of carousel 12.

Apparatus 5 is configured to receive bottles 2 at station 8, to advance bottles 2 along a treatment path Q from station 8 to a transfer station at which bottles 2 are transferred to an outlet conveyor or to a further treatment apparatus (not shown and known as such) and to fill the bottles 2 with the pourable product during advancement of bottles 2 along path Q. Preferentially, apparatus 5 is also adapted to apply the label sheets onto bottles 2 during advancement of bottles 2 along path Q.

More specifically, apparatus 5 comprises:
a filling carousel 18 adapted to rotate around a respective central axis B, in particular axis B having a substantially vertical orientation, even more particular axis B being parallel to axis A, for advancing bottles 2 along path Q; and
a plurality of filling units 19 peripherally arranged on carousel 18, in particular being equally spaced angularly around axis B and each one being adapted to receive one respective bottle 2 at station 8 and to fill the respective bottle 2 with the pourable product during advancement of the respective bottle 2 along path Q.

Apparatus 5 also comprises a storage unit (not shown and known as such) for storing the pourable product and being fluidically connected to units 19 for the delivery of the pourable product.

Preferentially, apparatus 5 also comprises a labeling device (not shown and known as such) adapted to apply label sheets onto bottles 2 at a labeling station.

Units 19 are also adapted to rotate the respective bottles 2 around the bottle's longitudinal axis during advancement along path Q, in particular for supporting application of the label sheets onto the bottles 2.

Figure 2:
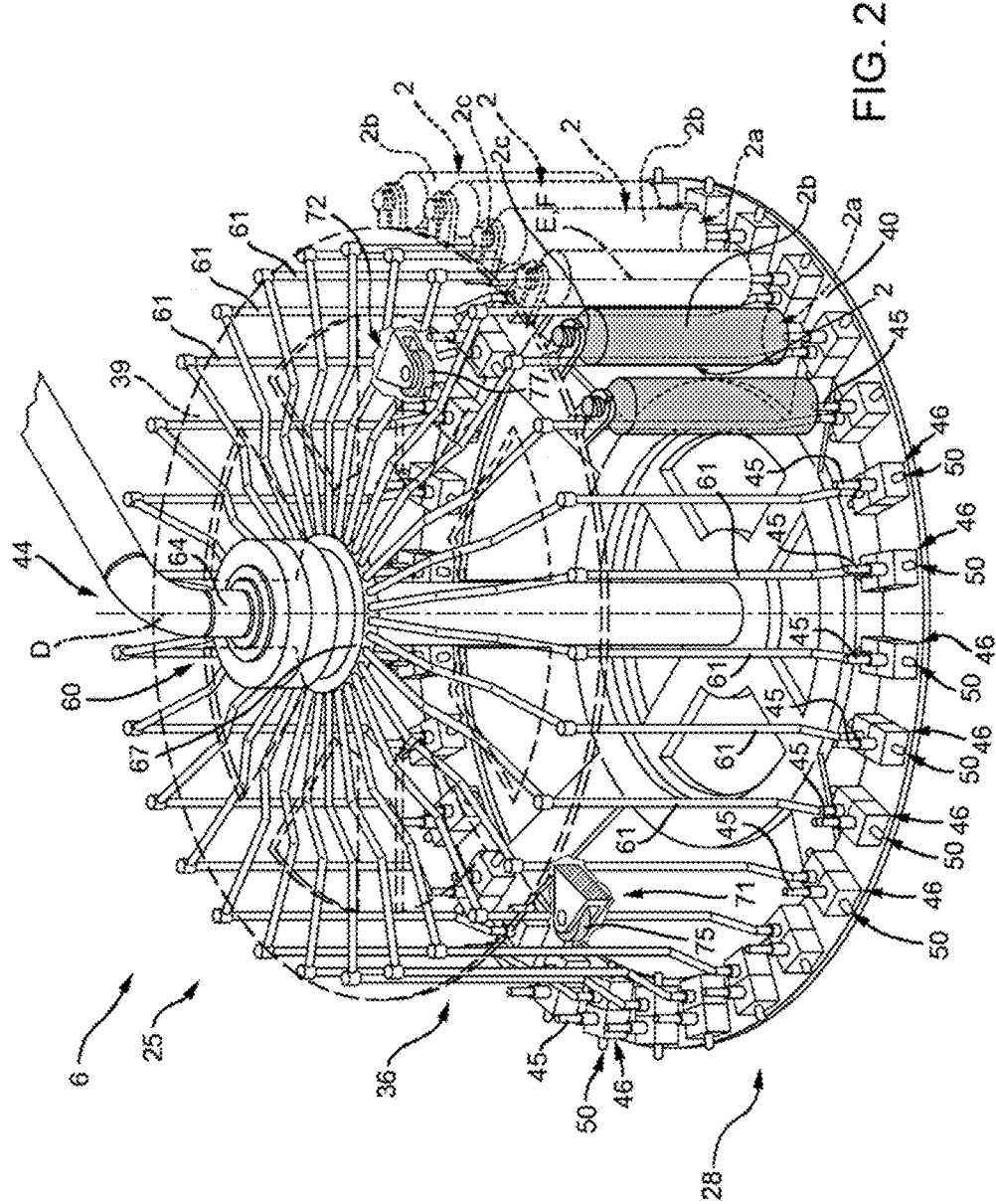
FIG. 2 shows a perspective view of a detail of the conveying and cooling apparatus of FIG. 1, with parts removed for clarity.
Figure 3:
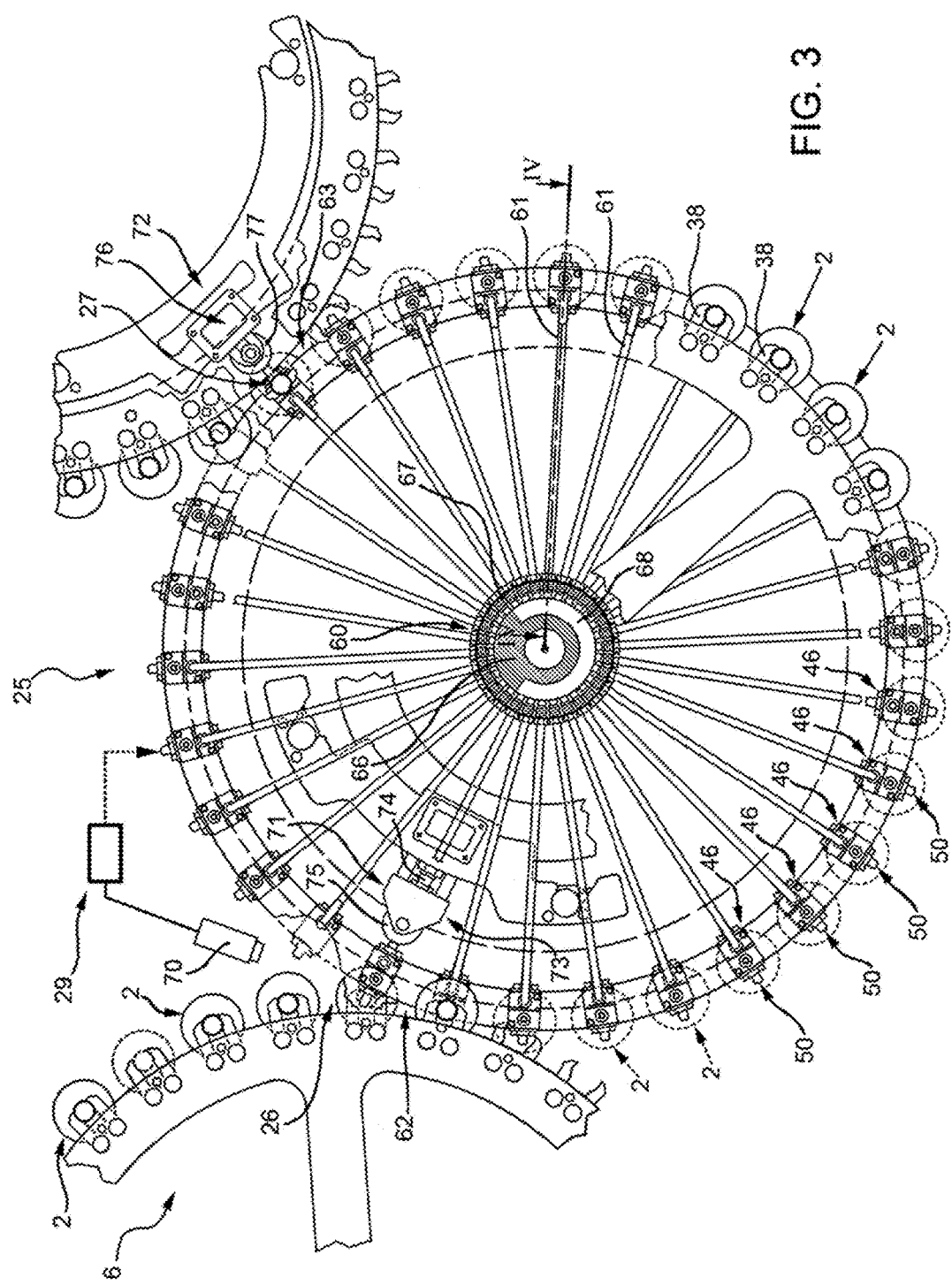
FIG. 3 shows a top plan view of details of the conveying and cooling apparatus, with parts removed for clarity.

With particular reference to FIGS. 1 to 3, conveying and cooling apparatus 6 comprises:
- a conveying device 25 adapted to advance bottles 2 along a portion P1 of path P, in particular having an arc-shaped configuration, from a receiving station 26 to a transfer station 27; and
- a cooling device 28 adapted to cool bottles 2 during advancement of bottles 2 along at least a section of portion P1.

Machine 1, in particular apparatus 6 also comprise
- a control unit 29 adapted to control operation of conveying device 25 and of cooling device 28.

Preferably, apparatus 6 also comprises a plurality of additional transport devices, each one adapted to advance bottles 2 along respective portions P2 of path P.

More specifically, in the example shown in FIG. 1, apparatus 6 comprises three additional star wheels 30, 31 and 32, each one adapted to rotate around one respective central axis C, in particular having a vertical orientation, even more particular being parallel to axes A and B.

Even more specifically, in the example shown in FIG. 1, star wheel 30 is interposed between apparatus and device 25. In particular, star wheel 30 is arranged peripherally adjacent, in particular tangential, to carousel 12 at pick-up station 7 and is furthermore arranged adjacent to device 25. Even more particular, star wheel 30 is configured to receive bottles 2 from apparatus 3 and to advance them to device 25; i.e. star wheel 30 advances bottles 2 from pick-up station 7 to receiving station 26.

Furthermore, in the example shown in FIG. 1, star wheels 31 and 32 are interposed between device 25 and apparatus 5. In particular, star wheel 31 is arranged adjacent to device 25 and star wheel 32. Star wheel 33 is arranged adjacent to apparatus 5, in particular star wheel 33 is arranged peripherally adjacent, in particular tangential, to carousel 18 at station 8. Even more particular, star wheel 31 is configured to receive bottles 2 from device 25 at transfer station 27 and to deliver them to star wheel 32. Star wheel 32 is configured to receive bottles 2 from star wheel 31 and to advance them to apparatus 5, in particular to carousel 18.

It must be noted that alternatively apparatus 6 could comprise only conveying device 25 or apparatus 6 could comprise one or more additional transport devices, in particular one or more star wheels being disposed in a manner different from the one shown in FIG. 1.

With particular reference to FIGS. 1 to 5, conveying device 25 comprises:
- a conveying carousel 36 rotatable around a central axis D for advancing bottles 2 along portion P1, in particular axis D having a vertical orientation, even more particular being parallel to axes A, B and C; and
- a plurality of retaining units 37, in particular being peripherally arranged on carousel 36, even more particular being equally spaced angularly around axis D, and each one being adapted to retain one respective bottle 2 during advancement of the respective bottle 2 along portion P1.

More specifically, retaining units 37 are configured to advance along a respective conveying path through stations 26 and 27, the conveying path of retaining units 37 having in particular a circular shape. Thus, in use, bottles 2 advance together with the respective retaining units 37.

In more detail, each retaining unit 37 comprises a gripping element 38 configured to be in at least an open state for receiving a respective bottle 2 and a closed state at which the gripping element 38 is adapted to retain the respective bottle 2. In particular, each retaining unit 37, more specifically the respective gripping element 38 is configured to retain the respective bottle 2 in an orientation so that the respective longitudinal axis E of each bottle 2 is coaxial to a respective retaining axis F of each retaining unit 37, axis F being parallel to axis D.

Preferentially, carousel 36 is arranged peripherally adjacent, in particular tangential, to star wheel 30 at station 26 and is arranged peripherally adjacent, in particular tangential, to star wheel 31 at station 27.

In more detail, conveying carousel 36 comprises:
- a drive unit (not shown and known as such) configured to actuate rotation of carousel 36; and
- a support structure for carrying retaining unit 37 and at least partially device 28.

Preferentially, the support structure comprises
- an upper support structure, in particular an upper support disc 39 coaxially arranged with respect to axis D; and
- a lower support structure, in particular a lower support disc 40 coaxially arranged with respect to axis D, in particular being arranged parallel to disc 39 and being arranged on a lower elevation than disc 39.

In even further detail, upper support disc 39 is configured to support retaining units 37, in particular gripping elements 38. Lower support disc 40 is configured to at least partially support cooling device 28 in a manner as will be described further below.

With particular reference to FIGS. 2 to 6, cooling device 28 comprises:
- a supply unit 44 for supplying a cooling medium, preferentially the cooling medium being a fluid, gas or a gas/fluid mixture, even more preferentially water or an air/water mixture;
- and a plurality of moveable injection nozzles 45 adapted to be in fluid connection with unit 44 and being adapted to direct the cooling medium onto bottles 2, in particular onto an outer surface of bottles 2, even more particular onto a bottom portion 2a of bottles 2 during advancement of bottles 2 along at least a section of portion P1.

Advantageously, each injection nozzle 45 is associated to one respective retaining unit 37. Furthermore, each injection nozzle 45 is adapted to advance along a nozzle path R, in particular through stations 26 and 27. Preferentially, path R is at least partially parallel to portion P1, even more preferentially path R is parallel to portion P1 between stations 26 and 27. Furthermore, path R is parallel to the conveying path of retaining units 37.

More specifically, conveying device 25, in particular carousel 36 is configured to advance injection nozzles 45 along nozzle path R, which preferably has a circular shape. Even more particular, device 25, in particular carousel 36 is configured to advance nozzles 45 synchronously to units 37 and accordingly to bottles 2 retained by the respective units 37 between stations 26 and 27. In other word, conveying device 25, in particular carousel 36 is configured to advance injection nozzles 45 in such a manner that injection nozzles 45 follow the respective bottles 2.

In particular, each injection nozzle 45 is arranged in the area of a bottom portion of the respective retaining unit 37. In particular, in use, each injection nozzle 45 is positioned below the respective bottle 2 being retained by the respective retaining unit 37 during advancement of the respective bottle 2 along portion P1. Preferentially, each injection nozzle 45 is arranged substantially coaxial to axis F; in other words, each injection nozzle 45 is positioned so that the injection nozzle 45 is coaxial to the respective bottle 2 during advancement of the respective bottle 2 along portion P1 (i.e. from station 26 to station 27).

Preferentially, each injection nozzle 45 is peripherally arranged on carousel 36, in particular being equally spaced angularly around axis D. In particular, each injection nozzle 45 is connected to, in particular being indirectly connected to disc 40.

Advantageously, cooling device 28 further comprises a plurality of valve members 46, each one associated to one respective injection nozzle 45 and each one being adapted to be at least in an open configuration at which the valve member 46 is configured to open the fluid connection between supply unit 44 and the respective injection nozzle 45 and a closed configuration at which the valve member 46 is configured to close the fluid connection between supply unit 44 and the respective injection nozzle 45.

Preferentially, each valve member 46 is adapted to advance on path R together with the respective injection nozzle 45.

Preferentially, each valve member 46 is peripherally arranged on carousel 36, in particular being equally spaced angularly around axis D. In particular, each injection nozzle 45 is connected to, in particular is carried by disc 40.

Furthermore, each valve member 46 is configured to support, in particular to carry the respective injection nozzle 45.

With particular reference to FIGS. 4 to 6, each valve member 46 comprises:
- an inlet opening 47 for receiving the cooling medium from supply unit 44;
- an outlet opening 48 for delivering the cooling medium to the respective injection nozzle 45;
- a distribution space 49 arranged between the inlet opening 47 and the outlet opening 48 and, in particular being configured to establish a fluid connection between inlet opening 47 and outlet opening 48; and
- a control element 50 adapted to open or to close the fluid connection between portions 47 and 48 for controlling the respective valve member 46 respectively into its open or closed configuration.

In more detail, each valve member 46 comprises a respective valve body 51 provided with the respective portions 47 and 48, the respective distribution space 49 and the respective control element 50. Each valve body 51 having a longitudinal axis G, in particular axis G being orthogonal to axis D with the respective valve member 46 being mounted on carousel 36.

Preferentially, each injection nozzle 46 is mounted onto, in particular screwed onto the respective valve body 51, in particular in the area of the respective outlet opening 48.

In further detail, each control element 50 is moveably arranged within the respective valve body 51, in particular being moveable along axis G for opening or closing the fluid connection between the respective inlet opening 47 and the respective outlet opening 48.

In further detail, each control element 50 is configured such that, in use, movement of control element 50 along axis G in a direction away from axis D opens the fluid connection between portions 47 and 48 and movement of control element 50 along axis G in a direction towards axis D opens the fluid connection between portions 47 and 48.

Preferentially, each control element 50 has a substantially cylindrical configuration. Each control element 50 is configured to cooperate with at least one sealing element 52 of the respective valve member 46, the respective sealing element 52 being arranged within the respective distribution space 49. In particular, each control element 50 comprises at least one functional portion 53 for cooperating with the respective sealing element 52 and having an enlarged cross-section for cooperating with the respective sealing element 52 for sealing/closing the fluid connection between openings 47 and 48. The respective functional portion 53 being housed within the respective distribution space 49.

Preferentially, each control element 50 also comprises a respective end portion 54 being arranged proximal to axis D and a respective end portion 55 arranged opposite of the respective end portion 54 (i.e. end portions 55 being distal from axis D). In particular, end portions 54 and 55 are arranged outside of distribution space 49, even more particular protruding radially away from base body 51.

With particular reference to FIGS. 2 to 4, supply unit 44 comprises a manifold assembly 60 coupled to carousel 36, in particular arranged onto carousel 36, even more particular coaxially mounted on carousel 36 and being adapted to distribute the cooling medium towards injection nozzles 45.

Preferably, the cooling device 28 comprises a plurality of connecting conduits, in particular tubes 61 arranged between supply unit 44, in particular assembly 60 and at least one respective valve member 46, in the specific example shown one.

In more detail, each tube 61 is connected to supply unit 44, in particular assembly 60 and one respective valve member 46 for establishing a fluid connection between the respective valve member 46 (for thereby establishing a fluid connection with the respective injection nozzle 45 and unit 44, in particular assembly 60).

Preferentially, each tube 61 is connected to the respective inlet opening 47 of the respective valve member 46.

Preferentially, cooling device 28, in particular supply unit 40, even more particular assembly 60 is configured to allow for supply of the cooling medium to injection nozzles 45 in dependence of the angular position of nozzles 45, in particular when, in use, injection nozzles 45 and the respective valve members 46 advance from a starting station 62 to an end station 63 along path R.

Preferentially, station 62 is arranged downstream of station 26 along path R, in particular immediately downstream of station 26 and station 63 is arranged upstream of station 27, in particular immediately upstream of station 27; i.e. stations 62 and 63 are interposed between stations 26 and 27 along path R.

Furthermore, bottles 2 advancing along portion P1 advance through stations 62 and 63.

Thus, cooling device 28 is adapted to direct the cooling medium onto bottles 2, in particular the outer surface of bottles 2, even more particular to the respective bottom portions 2a during advancement of bottles 2 from station 62 to station 63; i.e. the section of portion P1 along which cooling device 28 is adapted to direct the cooling medium onto bottles 2 is defined by stations 62 and 63. It must be noted, that in alternative embodiments stations 62 and 63 could be substantially identical to respectively stations 26 and 27.

Furthermore, assembly 60 is configured to interrupt supply of the cooling medium to valve members 46 and therewith to injection nozzles 45, when the injection nozzles 45 and, accordingly, the respective valve members 46 advance from station 63 to station 62. In other words, in use, after bottles 2 are transferred at station 26 to carousel 36 assembly 60 enables the supply of the cooling medium to valve members 46 and prior to bottles 2 being transferred at station 27 to apparatus 5, assembly 60 disables the supply of the cooling medium to valve members 46.

In further detail, assembly 60 comprises:
an inlet port 64 configured to fluidically connect to a cooling medium source, the cooling medium source being e.g. a cooling medium storage tank, a cooling medium distribution system of the production facilities, or the like; and
a plurality of outlet ports 65 each one connected to one respective tube 61.

Preferentially, assembly 60 comprises a fixed portion 66 carrying inlet port 64 and a rotatable distribution portion 67 carrying outlet ports 65 configured to rotate around axis D, in particular together with carousel 36.

Preferentially, fixed portion 66 comprises a conduit 68 having a substantially arc-shaped configuration, being in fluid connection with inlet port 64 and being adapted to be in fluidic connection with outlet ports 65. In particular, conduit 68 is configured such that a fluidic connection between conduit 68 and outlet ports 65 is established when the respective injection nozzles 45 advance from station 62 to station 63 along path R.

Advantageously, control unit 29 is adapted to selectively control each valve member 46 into the open configuration or the closed configuration during operation of the apparatus 6 itself. Preferentially, unit 29 is configured to selectively control each valve member 46 into the open configuration or the closed configuration, in particular with, in use, the respective injection nozzle 45 (and the valve member 46 itself) advancing from station 26 to station 27.

Control unit 29 is also configured to detect or determine the presence or lack of a respective receptacle 2 within units 37 and/or to detect or determine the presence of the presence of a defective bottle 2 within units 37. A defective bottle being any bottle 2 having any kind of defect which interferes with the correct use of the bottle (e.g. a bottle 2 having deformations, a bottle having imperfections, a bottle having cracks, a bottle having non-correctly formed walls or the like). In other words, defective bottles are these bottles 2, which need to be discarded from distribution. Preferentially, unit 29 is configured to control the respective valve member 46 into the closed configuration in the case control unit 29 itself detects or determines that the respective retaining unit 37 lacks a respective bottle 2 (i.e. no bottle 2 has been delivered to the respective retaining unit 37 at station 26) or it retains a defective bottle 2.

Preferably, unit 29 comprises at least one sensor assembly 70 adapted to determine the presence or the lack of a respective bottle 2 and/or the presence of a defective bottle 2 within retaining units 37 during advancement of retaining units 37 between stations 26 and 27. In particular, sensor assembly 70 is configured to determine or to detect the transfer of respective bottles 2 to retaining units 37 at station 26 and/or is configured to detect or to determine the presence of a defective bottle 2 within retaining units 37. In the example shown in FIG. 1, sensor assembly 70 has an optical sensor element arranged adjacent to carousel 36. Alternatively, sensor assembly 70 could comprise a plurality of sensor elements, each one associated to one respective retaining unit 37 for determining the presence or lack of a bottle 2 within the respective retaining unit 37 and/or the presence of a defective bottle 2.

Such sensor elements could e.g. operate by determining a force acting on the respective gripping elements 38.

Control unit 29 further comprises:
a first control assembly 71 arranged in the area of station 26 and being adapted to selectively control valve members 46 into the closed configuration; and
a second control assembly 72 arranged in the area of station 27 and being adapted to control valve members 46 into the open configuration.

More specifically, assembly 71 is configured such to interact with valve members 46 for selectively controlling valve members 46 into the closed configuration downstream of station 26 and upstream of station 62. In particular, assembly 71 is configured to control each valve member 46 into the closed configuration if sensor assembly 70 detects or determines the lack of a bottle 2 or the presence of a defective bottle 2 retained within the respective retaining unit 37.

With particular reference to FIGS. 3, 5 and 6, assembly 71 comprises an interaction member 73 adapted to selectively interact with the respective control elements 50 of valve members 46.

In more detail, interaction member 73 is controlled between an operative configuration at which it is adapted to interact with control elements 50 and a rest configuration at which interaction member 73 is retracted from control elements 50.

In further detail, interaction member 73 controlled into the operative configuration is adapted to direct elements 50 along axis G away from axis D.

In even further detail, interaction member 73 is positioned between axis D and lower support disc 40.

Preferentially, interaction member 73 comprises:
a piston element 74 being moveable between an extracted configuration and a retracted configuration; and
an engagement element, in particular a wheel 75 mounted to piston element 74 and adapted to cooperate with control elements 50, in particular with the respective end portions 54 for directing control elements 50 along axis G in a direction away from axis D.

In particular, interaction member 73 being in the operative configuration with piston element 74 being extracted, so as to establish contact between wheel 75 and control elements 50, in particular with the respective end portions 54, so as to direct control elements 50 away from axis D.

Preferentially, control assembly 71 comprises an actuation unit (not shown) for moving piston element 74. In particular, the actuation unit is pneumatically or electrically controlled, preferably pneumatically.

In more detail, assembly 72 is configured to control valve members 46 into the open configuration downstream of station 63 and upstream of station 26. In particular, assembly 72 is configured to control each valve member 46 in the open configuration in these cases in which assembly 71 has controlled the respective valve member 46 into the closed configuration.

In further detail, assembly 72 comprises an interaction element 76 arranged peripherally adjacent to carousel 36. Preferentially, interaction element 76 is arranged such to direct control elements 50 along axis G in a direction towards axis D, in particular when valve members 46 are in the closed configuration. In other words, interaction element 76 does not interact with control elements 50 if the respective valve members 46 are already in the open configuration.

Preferably, interaction element 76 comprises:
an engagement element, in particular a wheel 77, adapted to cooperate with control elements 50, in particular end portions 55; and
a fixing structure 78 for fixing wheel 77.

In use, preforms 4 are fed at station 11 to apparatus 3, in particular to respective molding units 13. During advancement of preforms 4 from station 11 towards station 7, in particular through rotation of carousel 12 around axis A, preforms 4 are formed (molded) into bottles 2. During further rotation of carousel 12, the formed bottles 2 are advanced to station 7 at which bottles 2 are transferred to apparatus 6. Apparatus 6 advances the bottles 2 along path P from station 7 to station 8. Apparatus 6 also directs a cooling medium onto bottles 2, in particular onto an outer surface of bottles 2, even more particular onto the respective bottom portions 2a during advancement of bottles 2 along at least a portion of path P. Bottles 2 are transferred at station 8 to apparatus 5, in particular to the respective filling units 5. Apparatus 5 advances bottles 2 along path Q, in particular through rotation of carousel 18 around axis B. During advancement along path Q bottles 2 are filled with a pourable product, in particular bottles 2 are filled by the respective filling units 19. During advancement of bottles 2 along path Q, the labelling device applies respective label sheets onto bottles 2 at the labeling station. After filling and labeling of bottles 2, bottles 2 are delivered at the transfer station of apparatus 5 to the outlet conveyor or to the further treatment apparatus.

In more detail, bottles 2 delivered to apparatus 6 are at first advanced by star wheel 30 along the respective portion P2 of path P from station 8 to station 26. Then, device 25 advances bottles 2 from station 26 to station 27 along portion P1 of path P, in particular through stations 62 and 63. In particular, bottles 2 are transferred at station 26 to the respective retaining units 37 and are advanced by rotation of carousel 36 around axis D.

Then, bottles 2 are further advanced from station 27 to station 8 by star wheels 31 and 32.

In even further detail, cooling device 28 directs the cooling medium onto bottles 2, in particular an outer surface of bottles 2, even more particular onto the respective bottom portions 2a during advancement of bottles 2 along at least a section of portion P1. Preferentially, cooling device 28 directs the cooling medium onto bottles 2 while bottles 2 advance from station 62 to station 63.

Advantageously, injection nozzles 45 advance along path R, in particular through rotation of carousel 36. Preferentially, path R is at least partially parallel to portion P1 of path P, in particular, path R is parallel with portion P1 between stations 26 and 27.

Preferentially, injection nozzles 45 advance synchronously with advancing bottles 2. In other words, each injection nozzle 45 follows the respective bottle 2 during advancement of the respective bottle 2 from station 26 to station 27 for guaranteeing that the injection nozzle 45 directs the cooling medium onto the respective bottom portion 2b, in particular when the respective bottle 2 advances from station 62 to station 63.

More specifically, each injection nozzle 45 advances along path R in such a manner that the injection nozzle 45 is arranged below the respective bottle 2, in particular the injection nozzle 45 is arranged coaxially with the respective bottle 2 when the respective bottles 2 and the injection nozzles 45 advance from station 26 to station 27.

Furthermore, during advancement along path R injection nozzles 45 are selectively controlled to be in fluid connection with supply unit 44, in particular when advancing between stations 26 and 27.

More specifically, valve members 46, which in particular advance together with the respective injection nozzles 45 along path R, are specifically controlled into the open or closed configuration, in particular to specifically open or close the fluid connection between the respective injection nozzles 45 when these advance between stations 26 and 27, in particular between stations 62 and 63.

Even more specifically, each valve member 46 is controlled, in particular by control unit 29, into the closed configuration if there is a lack of the respective bottle 2 or the presence of a defective bottle 2 within the respective retaining unit 37, in particular when bottles 2 advance between stations 26 and 27. Preferentially, the lack of the respective bottle 2 or the presence of a defective bottle having been detected or determined by control unit 29, in particular sensor assembly 70.

In more detail, interaction element 73 of control assembly 71 is controlled into the operative configuration for directing control element 50 away from axis D if the respective valve member 46 is to be controlled into the respective closed configuration.

Control assembly 72 controls valve members 46 into the open configuration. In particular, interaction element 76 interacts with the respective control elements 50 of these valve members 46, which are controlled by control assembly 73 into the closed configuration. Even more particular, interaction elements 76 directs the respective control elements 50 towards axis D.

Figure 7:
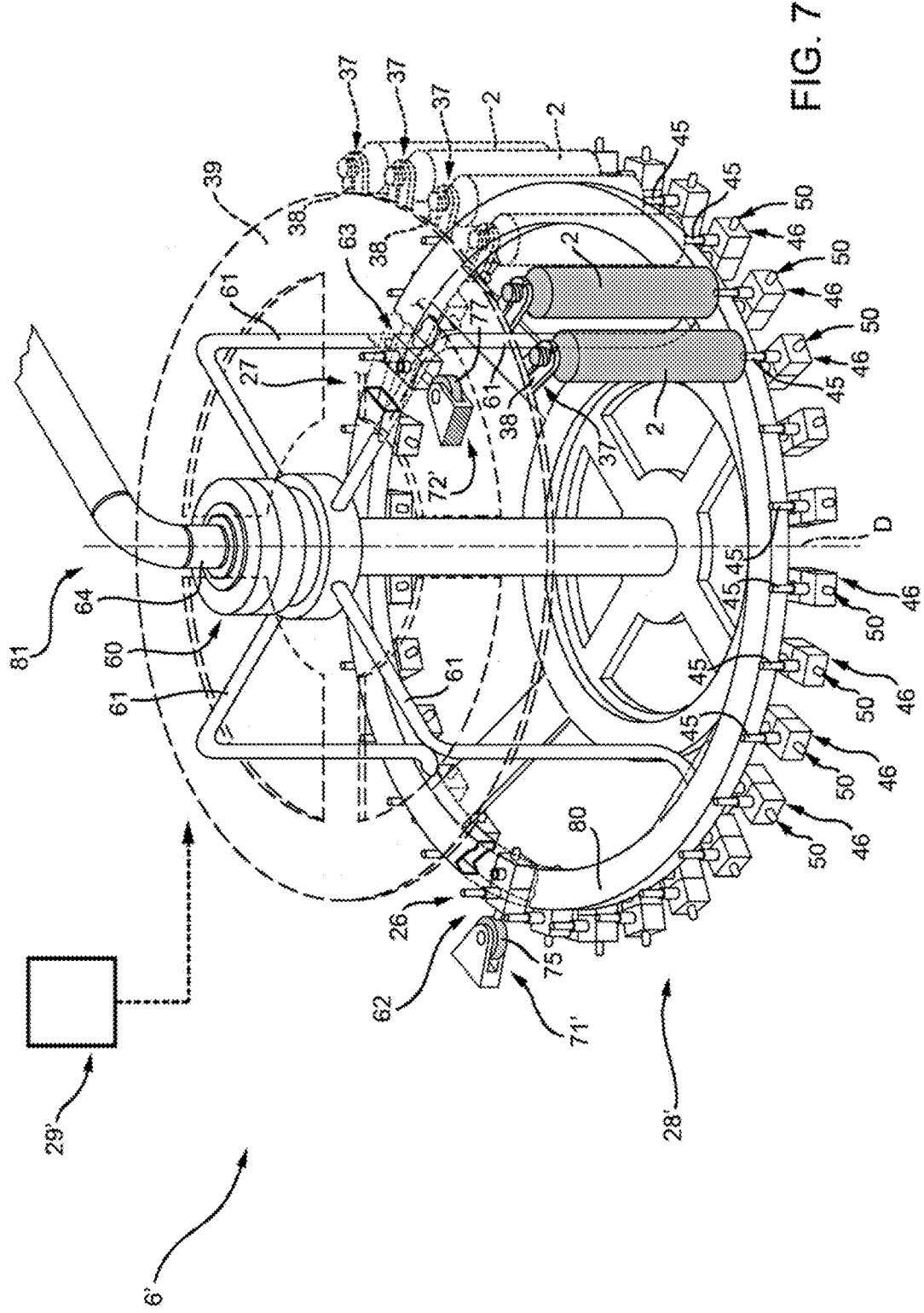
FIG. 7 shows a perspective view of a detail of a second embodiment of a conveying and cooling apparatus according to the present invention, with parts removed for clarity.

With reference to FIG. 7, number 6' indicates a second embodiment of a conveying and cooling apparatus according to the present invention; as apparatus 6' is similar to apparatus 6, the following description is limited to the differences between them, and using the same references, where possible, for identical or corresponding parts.

In particular, apparatus 6' differs from apparatus 6 in comprising cooling device 28' and in comprising control unit 29'.

Cooling device 28' differs from cooling device 26 in comprising:
  an annular tank 80 for the cooling medium, in particular coaxially arranged with respect to axis D of carousel 36, even more particular being carried by carousel 36; and
  a supply unit 81 for supplying the cooling medium being in fluid connection with tank 80.

Valve members 46 are in fluid connection with tank 80. In particular, the respective inlet portions 47 are fluidically connected to tank 80.

Supply unit 81 is similar to supply unit 44, which is why the description of supply unit 81 is limited to the differences between supply unit 81 and supply unit 44, and using the same references, where possible, for identical or corresponding parts.

Supply unit 81 differs from supply unit 44 in that conduits, in particular tubes 44 are connected to manifold assembly 60 and annular tank 80. Furthermore, the number of tubes 44 is reduced with respect to supply unit 44, in the specific example of FIG. 7 four tubes connect assembly 60 with tank 80.

A further difference is that manifold assembly 60 is configured to direct the cooling medium towards tubes 44 to tank 80 irrespective of the angular position of the tubes 44.

Control unit 29' is adapted to selectively control valve members 46 into the open configuration in the area of station 26, in particular after the respective retaining unit 37 having, in use, received the respective bottle 2 at station 26, even more in particular at station 62; and to control valve members 46 into the closed configuration in the area of station 27, in particular prior to the respective botte 2, being in use, transferred at station 27, even more particular at station 63.

In more detail, control unit 29' comprises:
- a first control assembly 71' arranged in the area of station 26, in particular at station 62 and being adapted to control valve members 46 into the open configuration; and
- a second control assembly 72' arranged in the area of station 27, in particular at station 63 and being adapted to control valve members 46 into the closed configuration.

In even more detail, control assembly 71' is adapted to be in an operative configuration at which it is configured to direct the respective control elements 50 of valve members 46 towards axis D for opening valve members 46 and a rest configuration at which control assembly 71' is set not to change the configuration of valve members 46.

Preferentially, control assembly 71' is biased into the operative configuration and is controlled into the rest configuration if sensor assembly 70 determines the lack of a respective bottle 2 within a retaining unit 37 and/or if the respective bottle 2 is defective, so that the respective valve member 46 remains in the closed configuration In particular, control assembly 71' is configured to interact with the respective end portions 55 of the respective control elements 50 of valve members 46.

Control assembly 71' can have substantially a configuration similar to the one of assembly 71, being arranged such that the respective wheel is adapted to interact with the respective end portions 55 of the respective control elements 50 when being controlled into the operative configuration.

In even more detail, control assembly 72' is configured to direct the respective control elements 50 of valve members 46 away from axis D. In particular, control assembly 72' is adapted to interact with the respective end portions 54 of the respective contact members 50 of valve members 46.

Preferentially, control assembly 72' is arranged between axis D and disc 40. Preferentially, control assembly 72' has a configuration similar to the one of control assembly 72.

The function of apparatus 6' is similar to the one of apparatus 6, which is why only the main differences are described.

In particular, control unit 29' controls valve members 46 into the open configuration in the area of station 26, in particular after the respective retaining units 37 having received the respective bottles 2, even more particular at station 62; and controls the valve members 46 into the closed configuration in the area of station 27, in particular prior to transferring bottles 2 at station 27, even more particular at station 63. Furthermore, if sensor assembly 70 detects or determines a lack of a bottle 2 within a respective retaining unit 37 or detects or determines the presence of a defective bottle 2 within a retaining unit 37, control unit 29' controls the respective valve member 46 into the closed configuration. In particular, in this case control unit 29' controls control assembly 71' into the rest configuration, in particular so that control assembly 71' is hindered from interacting with the respective control element 50.

The advantages of apparatuses 6 and 6' according to the present invention will be clear from the foregoing description.

A particular advantage of apparatuses 6 and 6' lies in apparatuses 6 and 6' allowing for an improved cooling of bottles 2, in particular of bottles 2 being transferred to apparatuses 6 and 6' while still being at elevated temperatures.

A further advantage is that the cooling medium is applied onto bottles 2 for an increased time as injection nozzles 45 follow bottles 2.

An even further advantage is that apparatus 6 and 6' allow to interrupt the injection of cooling medium by the respective injection nozzle 45 if the respective retaining unit 37 lacks the presence of a respective bottle 2 and/or if the retained bottle 2 is defective. This permits to avoid spoilage of the cooling medium. As well, this allows to avoid that the cooling medium is distributed within apparatuses 6 and 6' in an unwanted and uncontrolled manner.

Another advantage of apparatuses 6 and 6' is that the cooling medium is preferentially only directed onto the bottom portions 2a, thereby avoiding to leave traces of cooling medium on the lateral surfaces of bottles 2, which would interfere with the quality of the application of label sheets on bottles 2.

Clearly, changes may be made to apparatuses 6 and 6' as described herein without, however, departing from the scope of protection as defined in the accompanying claims.

In an alternative embodiment of apparatus 6 or 6', valve members 46 are pneumatically or electronically or electromagnetically controlled for being set in an open configuration or a closed configuration.

In a further alternative embodiment, apparatuses 6 or 6' could comprise elevation controlling means adapted to change the relative position between injection nozzles 45 and the bottom portions 2a of bottles 2 when bottles 2 are retained by retaining units 37. Such elevation controlling means could comprise outlet pieces having the appropriate extension to be attached onto injection nozzles 45. Alternatively, such elevation controlling means could comprise means to change the relative distance between discs 39 and 40. In this case, preferentially tubes 61 comprise at least one flexible portion.

In an even further alternative apparatus 6 or apparatus 6' could be integral to a treatment apparatus, such as a filling apparatus for filling bottles 2, in particular filling with a heated pourable product or a capping apparatus for applying closures onto bottles 2. In particular, in this case apparatus 6 or 6' could comprise at least a plurality of respective treatment units, such as a filling unit or a capping unit, adapted to perform a respective treatment, such as filling of bottles 2 or capping of bottles 2.

In another alternative apparatus 6 or 6' not shown, apparatus 6 or 6' is arranged downstream of a filling apparatus for filling bottles 2, in particular with a heated pourable product or a capping apparatus.

The invention claimed is:

1. An apparatus for conveying and cooling a plurality of receptacles, the apparatus comprising:
   - a conveying device configured to advance the receptacles along a conveying path from a receiving station to a transfer station, wherein the conveying device includes a plurality of retaining units, each retaining unit configured to retain at least one respective receptacle during advancement of the respective receptacle along the conveying path; and
   - a cooling device configured to cool the receptacles, wherein the cooling device includes a supply unit for supplying a cooling medium and a plurality of injection nozzles configured to direct the cooling medium onto the receptacles for cooling the receptacles during advancement of the receptacles along at least a portion of the conveying path, and wherein:
     - each injection nozzle is associated with at least one respective retaining unit;
     - the injection nozzles are movable along a nozzle path at least partially parallel to the conveying path and through the receiving station and the transfer station;

the cooling device further includes a plurality of valve members, each valve member being associated with at least one respective injection nozzle and being adjustable between an open configuration, in which the valve member is configured to open the fluid connection between the supply unit and the respective injection nozzle, and a closed configuration, in which the valve member is configured to close the fluid connection between the supply unit and the respective injection nozzle;

a control unit configured to control operation of the conveying device and the cooling device, wherein the control unit is configured to selectively control each valve member between the open configuration and the closed configuration during advancement of the injection nozzles between the receiving station and the transfer station.

2. The apparatus according to claim 1, further comprising a sensor assembly configured to determine at least one of whether a receptacle is present within the retaining units or whether a defective receptacle is present within the retaining units;

wherein the control unit is further configured to control the respective valve member or the respective valve members to be in the closed configuration when the sensor assembly determines that a receptacle is not present or a defective receptacle is present within the respective retaining unit or the respective retaining units.

3. The apparatus according to claim 1, wherein the control unit includes a first control assembly arranged in the area of the receiving station and being configured to selectively control the valve members to be in the closed or open configuration, and a second control assembly arranged in the area of the transfer station and being configured to control the valve members to be in the open or closed configuration.

4. The apparatus according to claim 1, wherein the cooling device further includes a plurality of connecting conduits, each connecting conduit being arranged between the supply unit and at least one respective valve member and being configured to establish the fluid connection between the supply unit and the respective injection nozzle.

5. The apparatus according to claim 1, wherein each injection nozzle is carried by the respective valve member (46).

6. The apparatus according to claim 1, wherein each injection nozzle is arranged in the area of a bottom portion of the respective retaining unit.

7. The apparatus according to claim 6, wherein each injection nozzle is configured to direct the cooling medium onto a bottom portion of a respective receptacle retained by the respective retaining unit.

8. The apparatus according to claim 1, wherein the conveying device is adapted to advance the injection nozzles along the nozzle path.

9. The apparatus according to claim 1, wherein the conveying device includes a carousel rotatable around a central axis; and wherein the retaining units are peripherally arranged on the carousel.

10. The apparatus according to claim 9, wherein the cooling device further includes an annular tank coaxially arranged with the carousel and configured to be in fluid connection with the valve members.

11. A machine for treating a receptacle, the machine comprising:

at least one conveying and cooling apparatus according to claim 1; and at least one treatment apparatus configured to perform one or more treatments on the receptacles;

wherein the treatment apparatus is configured to receive the receptacles from the conveying and cooling apparatus or the treatment apparatus is configured to transfer the receptacles to the conveying and cooling apparatus.

12. A method for operating a conveying and cooling apparatus according to claim 1, the method comprising:

advancing the receptacles along the conveying path from the receiving station to the transfer station;

advancing the injection nozzles along the nozzle path through the receiving station and the transfer station; and selectively controlling, via the control unit, the valve members to be in the open or closed configuration during advancement of the injection nozzles between the receiving station and the transfer station.

13. The method according to claim 12, further comprising:

determining at least one of whether a receptacle is present within the retaining units advancing between the receiving station and the transfer station or whether a defective receptacle is present within the retaining units advancing between the receiving station and the transfer station; and controlling the respective valve member or the respective valve members to be in the closed configuration of the respective retaining unit or the respective retaining units when a receptacle is not present or a defective receptacle is present within the respective retaining unit.

14. The method according to claim 12, wherein each injection nozzle directs the cooling medium onto the bottom portion of the respective receptacle during advancement of the receptacles along at least a portion of the conveying path.

15. The method according to claim 12, wherein the injection nozzles follow the respective receptacles during advancement of the receptacles from the receiving station to the transfer station.

16. The apparatus according to claim 3, wherein the first control assembly includes an interaction member configured to selectively interact with respective control elements of the valve members.

17. The apparatus according to claim 16, wherein the control unit is configured to selectively control the interaction member to move between an operative configuration, in which the interaction member interacts with the respective control elements of the valve members, and a rest configuration, in which the interaction member is retracted from the control elements.

18. The apparatus according to claim 17, wherein the interaction member includes:

a piston element moveable between an extracted configuration and a retracted configuration; and an engagement element configured to cooperate with the respective control elements of the valve members.

19. The apparatus according to claim 3, wherein the second control assembly includes an interaction element configured to selectively interact with respective control elements of the valve members.

20. The apparatus according to claim 19, wherein the interaction element includes an engagement element configured to cooperate with the respective control elements of the valve members.

* * * * *